(12) United States Patent
Ishiyama

(10) Patent No.: US 11,438,993 B2
(45) Date of Patent: Sep. 6, 2022

(54) X-RAY HIGH VOLTAGE APPARATUS AND POWER FACTOR CORRECTOR

(71) Applicant: CANON MEDICAL SYSTEMS CORPORATION, Otawara (JP)

(72) Inventor: Fumio Ishiyama, Nasushiobara (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 338 days.

(21) Appl. No.: 16/842,865

(22) Filed: Apr. 8, 2020

(65) Prior Publication Data

US 2020/0329548 A1 Oct. 15, 2020

(30) Foreign Application Priority Data

Apr. 10, 2019 (JP) .............................. JP2019-075131

(51) Int. Cl.
| | |
|---|---|
| *H05G 1/18* | (2006.01) |
| *H05G 1/12* | (2006.01) |
| *H02M 7/219* | (2006.01) |
| *H02M 1/42* | (2007.01) |

(52) U.S. Cl.
CPC ............ *H05G 1/12* (2013.01); *H02M 1/4208* (2013.01); *H02M 7/219* (2013.01); *H05G 1/18* (2013.01)

(58) Field of Classification Search
None
See application file for complete search history.

(56) References Cited

U.S. PATENT DOCUMENTS

| | | | | |
|---|---|---|---|---|
| 5,430,639 | A  * | 7/1995 | Takahashi | ........... H02M 1/4216 363/124 |
| 9,692,289 | B2 * | 6/2017 | Kamiya | ................ H02M 7/217 |
| 9,755,535 | B2 * | 9/2017 | Koyano | ................ H02M 1/126 |
| 9,960,703 | B2 * | 5/2018 | Hatakeyama | ........ H02M 1/4225 |
| 2007/0195560 | A1* | 8/2007 | Yasumura | ................. G05F 1/70 363/21.01 |
| 2010/0045113 | A1* | 2/2010 | Hishikawa | ......... G01R 33/3614 307/77 |

FOREIGN PATENT DOCUMENTS

JP 10-178781 A 6/1998

* cited by examiner

*Primary Examiner* — Hoon K Song
(74) *Attorney, Agent, or Firm* — Oblon, McClelland, Maier & Neustadt, L.L.P.

(57) ABSTRACT

According to one embodiment, the X-ray high voltage apparatus includes a plurality of converters and control circuitry. The plurality of converters converts AC power to DC power. Each converter includes choke coils and three-phase rectifier circuits. Each choke coil has a main winding and is provided on each phase line of three-phase AC power supply lines. Each three-phase rectifier circuit includes a switching device. The control circuitry is configured to interleave the plurality of converters. Each choke coil of the each converter has the single main winding and two correction windings of a first correction winding and a second correction winding. Each of currents flowing through the respective two correction windings is a sum of currents flowing through the plurality of converters performing interleaving operation, and flows so as to cancel a magnetic flux generated in the main winding.

8 Claims, 11 Drawing Sheets

X-RAY HIGH VOLTAGE APPARATUS AND POWER FACTOR CORRECTOR

CROSS-REFERENCE TO RELATED APPLICATIONS

This application claims the benefit of priority of Japanese Patent Application No. 2019-075131, filed Apr. 10, 2019, the entire contents of which are incorporated herein by reference.

FIELD

Disclosed embodiments described herein relate generally to an X-ray high voltage apparatus and a power factor corrector.

BACKGROUND

A capacitor input type AC/DC converter may be applied as an AC/DC converter of a three-phase AC large output power supply used for an X-ray diagnostic apparatus, an X-ray CT (Computed Tomography) apparatus, an MRI (magnetic resonance imaging) apparatus, and the like. The capacitor input type AC/DC converter is small in size, but has a problem that a large harmonic current flows in a power supply, which adversely affects the system.

A method using a power factor correction (PFC) circuit is known as a method for reducing the harmonic current. When the conventional PFC circuit is applied to a large output power supply, the power factor can be improved by reducing the harmonic current.

However, when the conventional PFC circuit is applied to a large output power supply, there arises a problem that a large current of a commercial frequency (50 Hz or 60 Hz) flows through the choke coil inserted in each phase of the three-phase alternating current. In this case, it is necessary to design the iron core of the choke coil to have a large sectional area so as not to magnetically saturate the iron core, and the choke coil becomes large. Therefore, it is difficult to provide a large output power supply to which this type of PFC circuit is applied in a limited mounting space such as a rotating unit of an X-ray CT apparatus.

DETAILED DESCRIPTION

Hereinbelow, a description will be given of an X-ray high voltage apparatus and a power factor corrector according to embodiments with reference to the accompanying drawings.

In general, according to one embodiment, the X-ray high voltage apparatus includes a plurality of converters and control circuitry. The plurality of converters converts AC power to DC power. Each converter includes choke coils and three-phase rectifier circuits. Each choke coil has a main winding and is provided on each phase line of three-phase AC power supply lines. Each three-phase rectifier circuit includes a switching device. The control circuitry is configured to interleave the plurality of converters. Each choke coil of the each converter has the single main winding and two correction windings of a first correction winding and a second correction winding. Each of currents flowing through the respective two correction windings is a sum of currents flowing through the plurality of converters performing interleaving operation, and flows so as to cancel a magnetic flux generated in the main winding.

Figure 1:
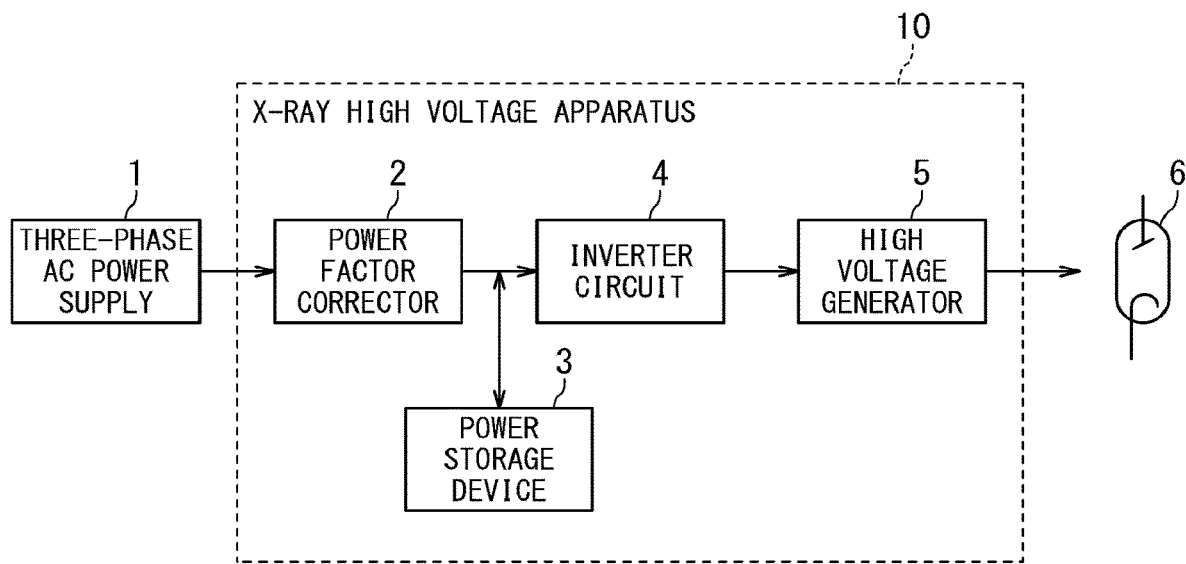
FIG. 1 is a block diagram showing an example of an X-ray high voltage apparatus including a power factor corrector according to an embodiment.

FIG. 1 is a block diagram showing an example of an X-ray high voltage apparatus 10 including a power factor corrector 2 according to an embodiment. The converter according to the present embodiment for converting an AC voltage of the three-phase AC power supply 1 into a DC voltage is a power factor correction converter (hereinafter, referred to as a power factor corrector) 2 in which three-phase AC power is input and a plurality of converters operate interleaving.

The X-ray high voltage apparatus 10 includes a power factor corrector 2, a power storage device 3, an inverter circuit 4, and a high voltage generator 5.

The AC voltage of the three-phase AC power supply 1 is converted into a DC voltage by the power factor corrector 2 and then is converted into a high-frequency AC voltage by the inverter circuit 4. The high voltage generator 5 generates a high DC voltage based on the high frequency AC voltage output from the inverter circuit 4 and applies the high DC voltage to the X-ray tube 6. When the high DC voltage is applied to the X-ray tube 6, X-rays are generated from the X-ray tube 6.

The power storage device 3 is realized by a device capable of storing a DC voltage, such as an electric double layer capacitor, an electrolytic capacitor, and a lithium ion capacitor. The power storage device is provided to a DC voltage line for supplying the DC voltage from the power factor corrector 2 to the inverter circuit 4. When the X-ray high voltage apparatus 10 is used in an X-ray CT apparatus, and when an output exceeding the allowable power of the three-phase AC power supply 1 is required, such as in a mode in which the X-ray intensity is changed during a CT scan, the DC power can be supplied to the inverter circuit 4 from both the power factor corrector 2 and the power storage device 3. As a result, it is possible to output a large amount of X-rays for a short time.

Figure 2:
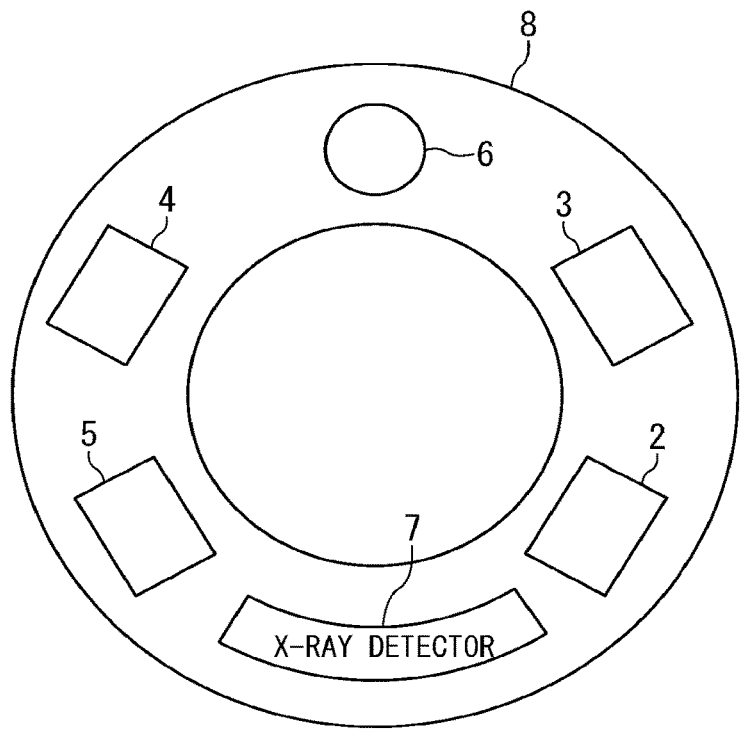
FIG. 2 is a block diagram showing an example of an arrangement in a case where an X-ray high voltage apparatus is mounted on a rotating unit of an X-ray CT apparatus.

FIG. 2 is a block diagram showing an example of an arrangement in a case where an X-ray high voltage apparatus 10 is mounted on a rotating unit 8 of an X-ray CT apparatus.

The X-ray tube 6 and the X-ray detector 7 need to be arranged to face each other. For this reason, other components including the units constituting the X-ray high voltage apparatus 10, the power factor corrector 2, the power storage device 3, the inverter circuit 4, and the high voltage generator 5, are arranged so as to avoid the X-ray tube 6 and the X-ray detector 7.

Here, problems of the conventional PFC circuit will be described.

Figure 3:
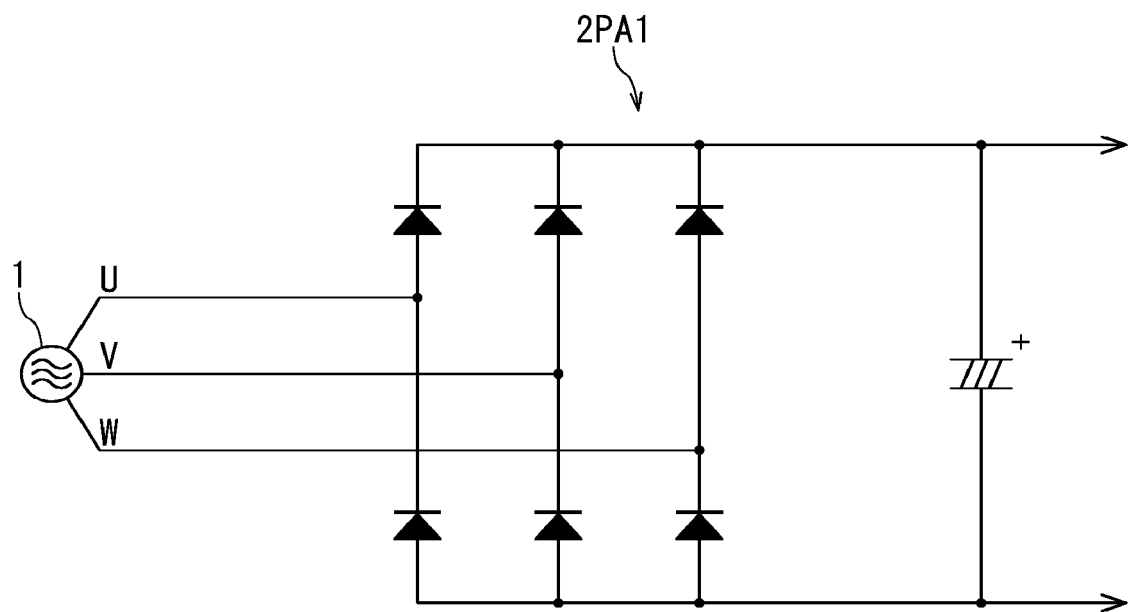
FIG. 3 is a circuit of an example of a conventional AC/DC converter circuit.
Figure 4:
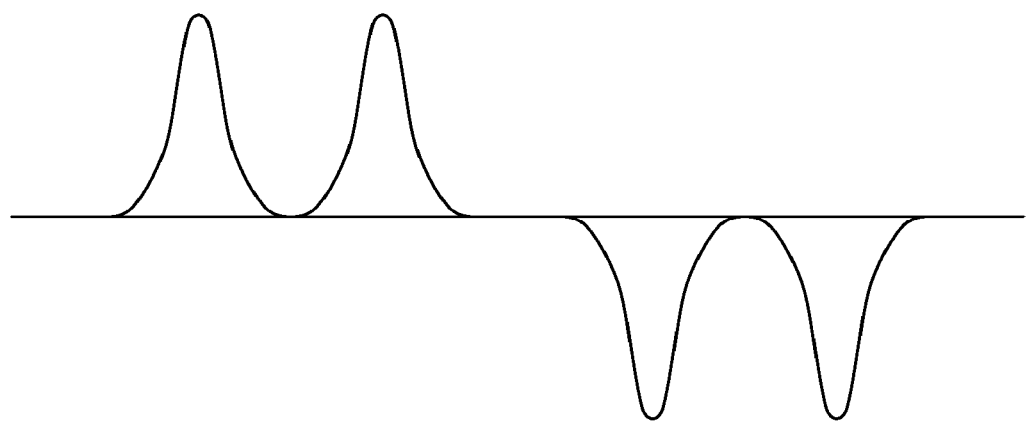
FIG. 4 is an explanatory diagram showing harmonics included in a power supply line of a conventional AC/DC converter circuit.

FIG. 3 is a circuit of an example of the conventional AC/DC converter circuit 2PA1. FIG. 4 is an explanatory diagram showing harmonics included in a power supply line of the conventional AC/DC converter circuit 2PA1.

In a conventional X-ray diagnostic apparatus or X-ray CT apparatus using a three-phase AC power supply 1 as an input, a three-phase full-wave rectifier circuit using six diodes is often used as shown in FIG. 3, for example, as an AC/DC converter for operating a high-power high-voltage power supply circuit for generating X-rays. However, the current flowing through the power supply line of the conventional AC/DC converter circuit 2PA1 contains many odd-order harmonics components as shown in FIG. 4, which may adversely affect the power system.

The power factor is low in the case of the current waveform as shown in FIG. 4. Hence, the three-phase AC power supply 1 is required to have apparent powers larger than that required by an apparatus such as an X-ray diagnostic apparatus or an X-ray CT apparatus. For this reason, the voltage drop of the power supply line also increases when the load is applied.

With regard to the harmonic current regulation EN61000-3-2, a device having a special current waveform exceeding 600 W is not subject to the regulation. However, it is preferable that an X-ray diagnostic apparatus or an X-ray CT apparatus that needs a large amount of power improves the power factor and reduces the harmonic current.

Conventionally, a circuit has been developed as a power factor corrector of a three-phase rectifier that improves the power factor by making the current waveform of the three-phase power supply a sinusoidal waveform. According to the conventional power factor corrector, the power factor can be effectively improved by reducing the harmonic current.

However, in the conventional power factor corrector, a large current having a low commercial frequency of 50 Hz or 60 Hz flows through the choke coil inserted in each phase of the three-phase AC power supply. Thus, the cross-sectional area of the iron core of the choke coil is increased so as not to magnetically saturate the iron core. As a result, the conventional power factor corrector is increased in size.

Meanwhile, an X-ray diagnostic apparatus or an X-ray CT apparatus requires a large amount of power only for a short time when irradiating X-rays for X-ray imaging. Considering that the time during which a large current flows through the three-phase AC power supply input lines is short, the winding of the choke coils provided on the three-phase AC power supply input lines can be thin and light. However, the iron core of the choke coil needs to be designed so as not to cause magnetic saturation at the maximum current even for a moment. Hence, the choke coil is necessary to be designed to withstand the current at the time of X-ray irradiation at the maximum output, and it is necessary to prepare a large choke coil for a short time of X-ray irradiation. This results in an increase in the size of the apparatus.

Further, in the X-ray CT apparatus, a high-power X-ray power supply is mounted on the rotating unit, and the size and mass of the power supply device are strongly restricted. Therefore, when the conventional power factor corrector is applied, it is difficult to mount the power supply device on the rotating unit.

In the X-ray diagnostic apparatus, it is required to reduce the size of the high-power X-ray power supply and arrange it as close to the X-ray tube as possible. This is to reduce the length of the high-voltage cable for supplying a high voltage to the X-ray tube, and to reduce unnecessary exposure due to electric charges accumulated in the high-voltage cable.

In order to solve these problems, the X-ray high voltage apparatus 10 including the power factor corrector 2 according to the present embodiment performs interleaving operation (operates with phase shifting) on a plurality of high-frequency converter circuits, and the choke coil has a main winding and two correction windings. By using two correction windings to cancel magnetic flux generated by an alternating current of a commercial frequency (about 50 Hz or 60 Hz) superimposed on the main winding, thereby the choke coil is reduced in size and weight. Further, the power factor corrector 2 according to the present embodiment has an output voltage adjusting function, and can level the power consumption of the apparatus and easily suppress the peak power by combining with the power storage device 3.

Figure 5:
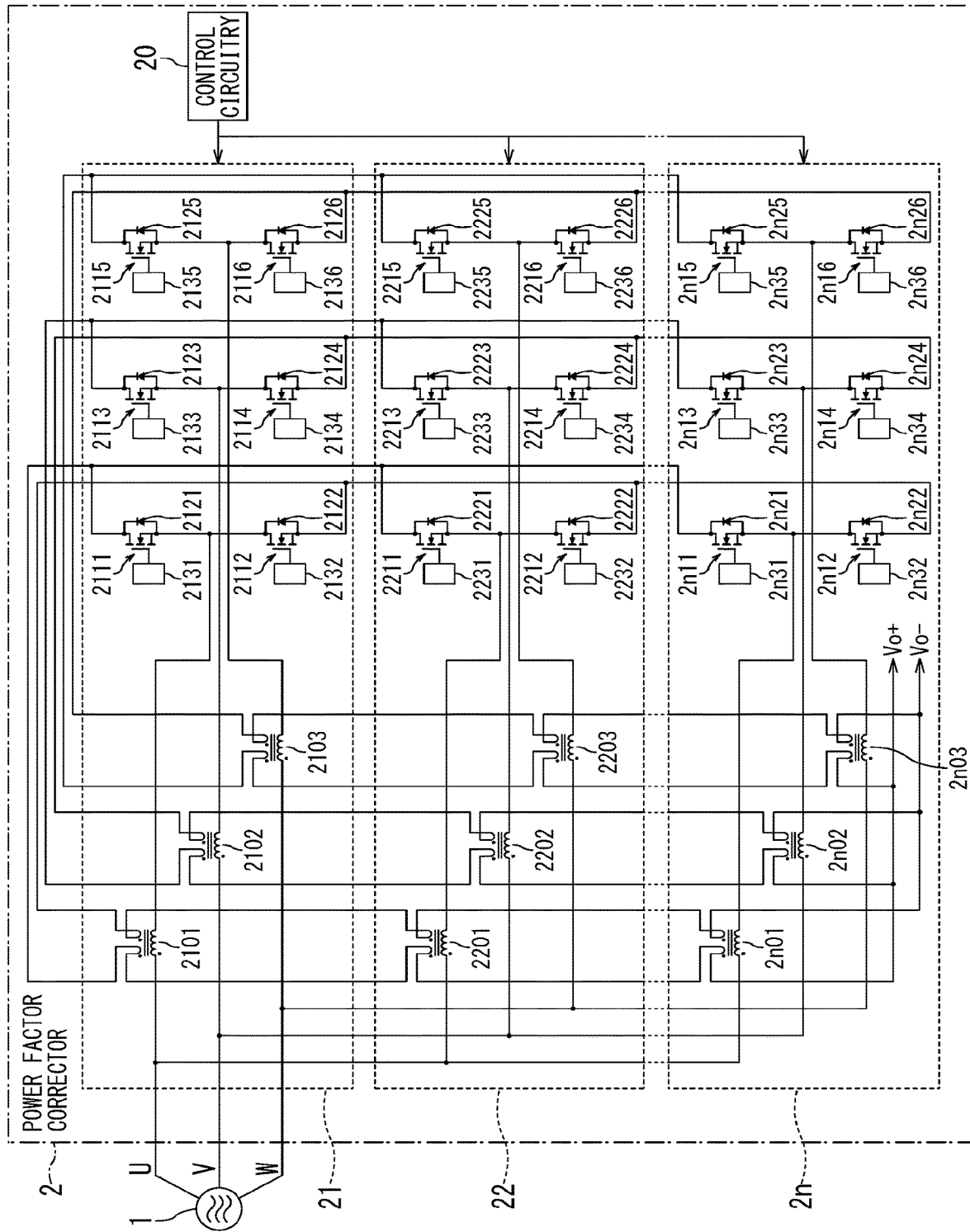
FIG. 5 is a circuit diagram showing an example of a power factor corrector according to the embodiment.

FIG. 5 is a circuit diagram showing an example of the power factor corrector 2 according to the embodiment. Briefly, the power factor corrector 2 has n converter circuits, and each of the converter circuits has three coils, six MOSFETs, and six diodes, and operates by interleaving the switching phases of the MOSFETs. For example, when n=8, eight converter circuits operate with a phase difference of 45°. A MOSFET is an example of a switching device. A circuit constituted by a MOSFET and a diode connected in parallel to the MOSFET is an example of a three-phase rectifier circuit.

The control circuitry 20 is a processor that controls a MOSFET driver of each converter circuit so as to perform an interleaving operation of the plurality of converter circuits.

The basic operation of the power factor corrector 2 shown in FIG. 5 in which the voltage of the U-V phase of the three-phase AC power supply 1 is positive will be described with an example of the converter circuit 21, among the n converter circuits 21 to 2*n*, which has MOSFETs 2111 to 2116, MOSFET drivers 2131 to 2136, and diodes 2121 to 2126.

First, when the MOSFET 2112 is turned on, the current flowing from the U phase of the three-phase AC power supply 1 passes through the main winding of the choke coil 2101 provided on the U phase line, MOSFET 2112, the second correction windings of the choke coils 2101 to 2*n*01 (corresponding to the right side winding of the two correction windings in FIG. 5), the second correction windings of the choke coils 2*n*02 to 2102, the diode 2124, and the main winding of the choke coil 2102, to return to the V phase of the three-phase AC power supply 1. The operation of the second correction winding of the choke coils 2101 to 2*n*01 and the operation of the second correction winding of the choke coils 2*n*02 to 2102 will be described later.

Next, when the MOSFET 2112 turns off, the current flowing from the U-phase of the three-phase AC power supply 1 passes through the main winding of the choke coil 2101, the diode 2121, and the first correction windings of the choke coils 2101 to 2*n*01 (corresponding to the left side winding of the two correction windings in FIG. 5), and is outputted to the inverter circuit 4 via the positive output terminal Vo+ of the power factor corrector 2 (see the lower center of FIG. 5). The outputted current, that supplies power to the inverter circuit 4 and returns to the negative output terminal Vo− of the power factor corrector 2 (see the lower center of FIG. 5), passes through the second correction windings of the choke coils 2*n*02 to 2102, the diode 2124, and the choke coil 2102 to return to the V phase of the three-phase AC power supply 1.

Another operation when the voltage of the U-V phase of the three-phase AC power supply 1 is positive is an operation of turning on/off the MOSFET 2113. The MOSFET 2113 operates 180° out of phase with the MOSFET 2112.

When the MOSFET 2113 is on, the current flowing from the U-phase of the three-phase AC power supply 1 passes through the main winding of the choke coil 2101, the diode 2121, the first correction windings of the choke coils 2101 to 2*n*01, the first correction windings of the choke coils 2*n*02 to 2102, the MOSFET 2113, and the main winding of the choke coil 2102 to return to the V phase of the three-phase AC power supply 1.

When the MOSFET 2113 turns off, the current flowing from the U-phase of the three-phase AC power supply 1 passes through the main winding of the choke coil 2101, the diode 2121, and the first correction windings of the choke coils 2101 to 2*n*01, and is outputted to the inverter circuit 4 via the positive output terminal Vo+ of the power factor corrector 2. The outputted current, that supplies power to the inverter circuit 4 and returns to the negative output terminal Vo− of the power factor corrector 2 (see the lower center of FIG. 5), passes through the second correction windings of the choke coils 2*n*02 to 2102, the diode 2124, and the main winding of the choke coil 2102 to return to the V phase of the three-phase AC power supply 1.

Figure 6:
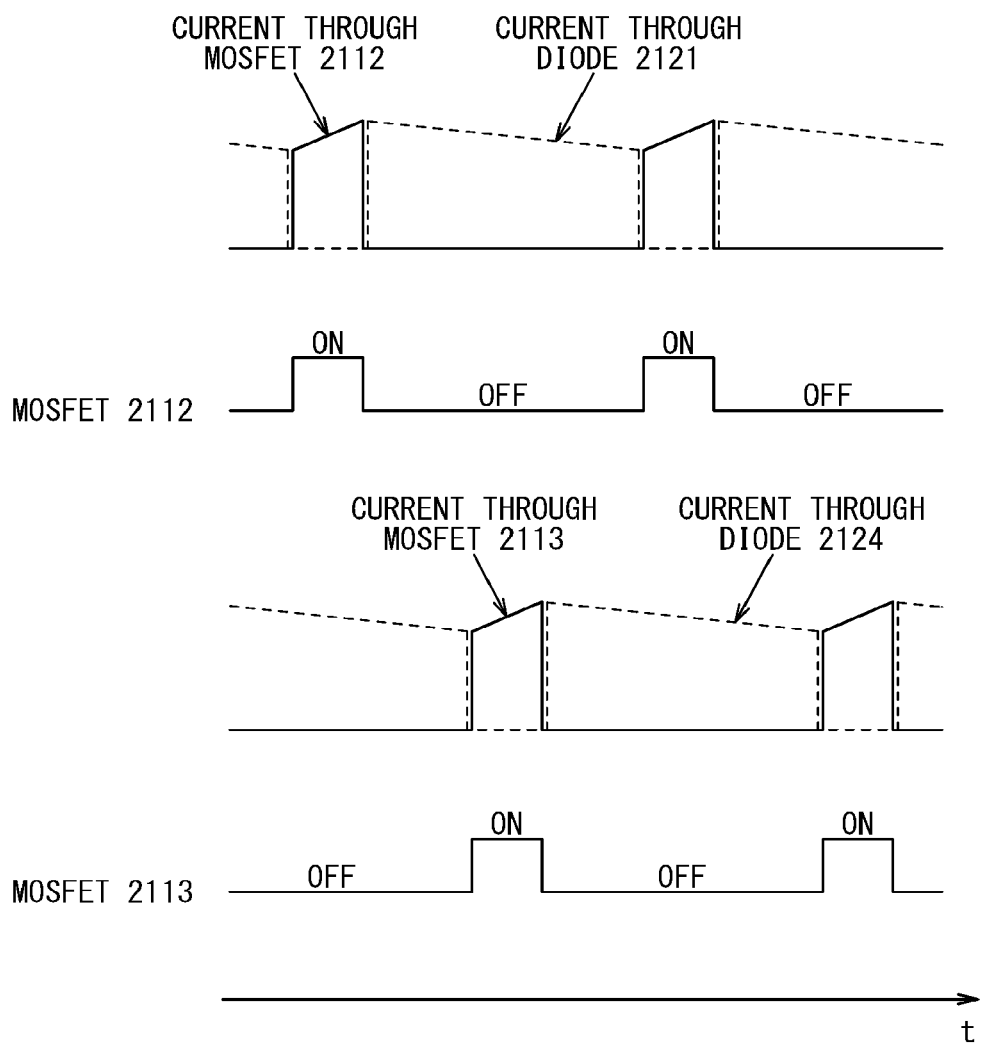
FIG. 6 is an explanatory diagram showing an example of an operation waveform when the MOSFET 2112 is turned on/off and an operation waveform when the MOSFET 2113 is turned on/off in the operation when the voltage of the U-V phase of the three-phase AC power supply is positive.
Figure 7:
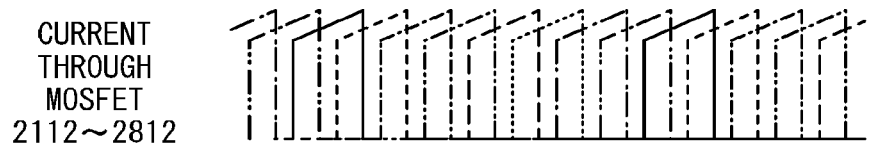
FIG. 7 is an explanatory diagram showing an example of the relationship between MOSFET on/off timings, MOSFET currents, and diode currents when there are eight converter circuits.
Figure 7:
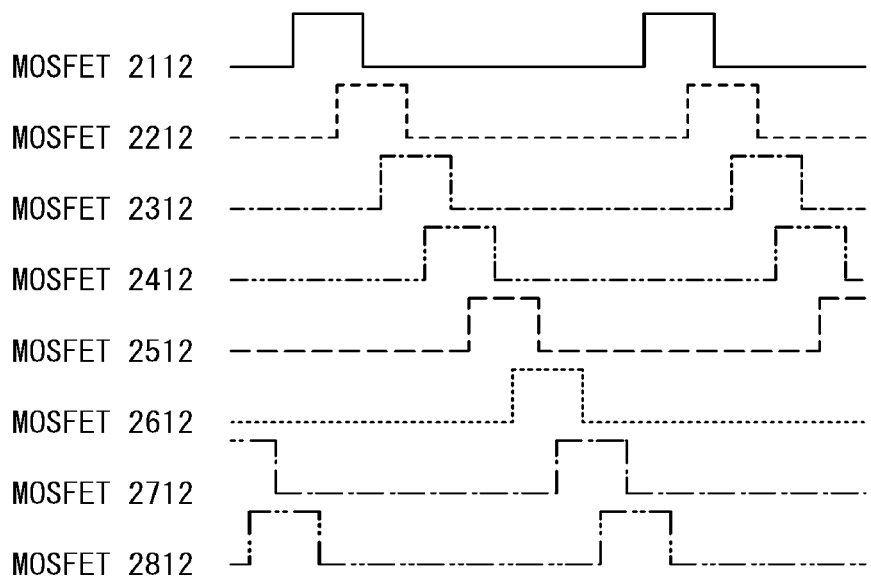
Figure 7:
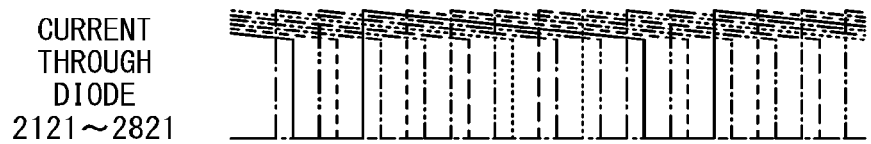

FIG. 6 is an explanatory diagram showing an example of an operation waveform when the MOSFET 2112 is turned on/off and an operation waveform when the MOSFET 2113 is turned on/off in the operation when the voltage of the U-V phase of the three-phase AC power supply is positive. FIG. 7 is an explanatory diagram showing an example of the relationship between on/off timings of MOSFETs 2112-2812, currents through MOSFETs 2112-1812, and currents through diodes 2121-2821, when there are eight converter circuits.

The eight MOSFETs 2112 to 2812 perform on/off operations with a phase shift of 45°. FIG. 7 shows an example in which the currents flowing through the MOSFETs 2112 to 2812 overlap each other. The overlapping current of the MOSFETs 2112 to 2812 flows through the second correction windings of the choke coils 2101 to 2*n*01 in FIG. 5 (e.g., the choke coils 2101 to 2801 in the case of eight converter circuits), and the overlapping current of the diodes 2121-2821 flows through the first correction windings of the choke coils 2101 to 2*n*01 in FIG. 5 (e.g., the choke coils 2101 to 2801 in the case of eight converter circuits).

The same can be applied when the voltage of the V-W phase of the three-phase AC power supply 1 is positive and when the voltage of the W-U phase is positive, though the operating MOSFETs, diodes, and choke coils are different.

Next, the operation when the voltage of the U-V phase of the three-phase AC power supply 1 is negative will be described using the converter circuit 21 as an example, as in the case of the positive case described above.

First, when the MOSFET 2114 is turned on, the current supplied from the V phase of the three-phase AC power supply 1 passes through the main winding of the choke coil 2102, the MOSFET 2114, the second correction windings of the choke coils 2102 to 2*n*02, the second correction windings of the choke coils 2*n*01 to 2101, the diode 2122, and the main winding of the choke coil 2101, to return to the U-phase of the three-phase AC power supply 1.

Next, when the MOSFET 2114 turns off, the current flowing from the V-phase of the three-phase AC power supply 1 passes through the main winding of the choke coil 2102, the diode 2123, and the first correction windings of the choke coils 2102 to 2*n*02, and is outputted to the inverter circuit 4 via the positive output terminal Vo+ of the power factor corrector 2. The outputted current, that supplies power to the inverter circuit 4 and returns to the negative output terminal Vo− of the power factor corrector 2, passes through the second correction windings of the choke coils 2*n*01 to 2101, the diode 2122, and the main winding of the choke coil 2101 to return to the U-phase of the three-phase AC power supply 1.

When the voltage of the V-W phase of the three-phase AC power supply 1 is negative, the waveforms of the currents through the MOSFETs and the diodes are the same as those shown in FIG. 6, though the operating MOSFETs and diodes are different. Further, the operation when there are eight converters is the same as the operation when the voltage of the V-W phase is positive as shown in FIG. 7, though the operating MOSFETs and diodes are different. The same can be applied when the voltage of the V-W phase of the three-phase AC power supply 1 is negative and when the voltage of the W-U phase is negative.

Figure 8:
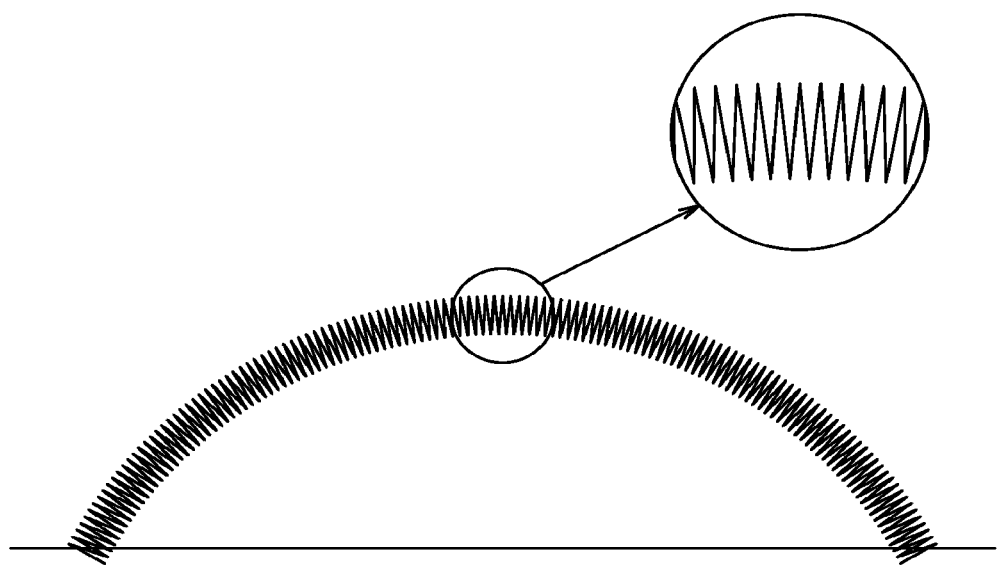
FIG. 8 is an explanatory diagram showing an example of a waveform of a current flowing through a main winding of a choke coil.

FIG. 8 is an explanatory diagram showing an example of a waveform of a current flowing through a main winding of a choke coil. In addition, to prioritize the visibility, following figures including FIG. 8 show an example in which the microscopic shape of the current waveform is a shape close to an isosceles triangle (that is, the ON time and the OFF time of the MOSFET are almost equal).

The MOSFETs 2111 to 2*n*26 shown in FIG. 5 perform on/off operations at a frequency much higher (for example, 100 kHz) than the frequency of the three-phase AC power supply 1 (generally, 50 Hz or 60 Hz). Thus, the currents through the MOSFETs and the diodes has a waveform as shown in FIGS. 6 and 7 when locally observed for a short period, but considering the high frequency of the three-phase AC power supply 1, the envelope of the switching waveform changes with time according to the power supply frequency. As described above, the current flowing through the choke coils 2101 to 2n03 is a sum of the currents flowing through the MOSFETs and the currents flowing through the diodes. Hence, the current flowing through the choke coils 2101 to 2n03 rises when the MOSFETs are on and falls when the MOSFETs are off.

As shown in FIG. 6, in the operation when the voltage of the U-V phase of the three-phase AC power supply 1 of the power factor corrector 2 shown in FIG. 5, the current flowing through the main winding of the choke coil 2101 has a waveform as shown in FIG. 8 considering the case where only the converter circuit 21 having the MOSFETs 2111 to 2116 and the diodes 2121 to 2126 is operated. In this case, the ratio of the on-time to the switching cycle of the MOSFET is modulated according to the change in the voltage of the AC power supply, and the envelope of the switching current is made sinusoidal, thereby reducing harmonic components of the current waveform. In this respect, it is similar to the conventional power factor correction circuit.

Figure 9:
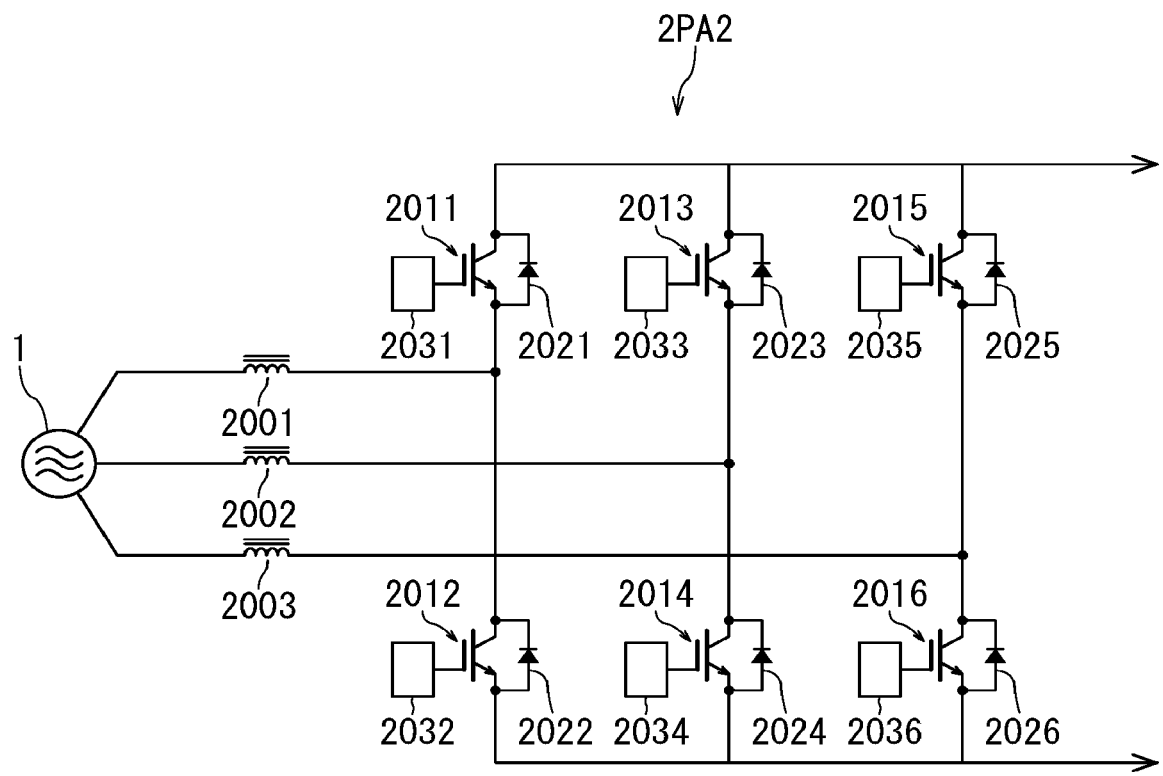
FIG. 9 is a circuit diagram showing an example of a conventional power factor correction converter.

FIG. 9 is a circuit diagram showing an example of a conventional power factor correction converter 2PA2. The conventional power factor correction converter 2PA2 comprises an AC/DC converter constituted by a bridge circuit including choke coils 2001, 2002, 2003 (corresponding to the main winding of the choke coil according to the present embodiment) provided on each phase line of the three-phase AC power supply 1, IGBTs 2011 to 2016, diodes 2021 to 2026, and IGBT drivers 2031 to 2036.

An X-ray diagnostic apparatus and an X-ray CT apparatus need to handle power of tens of kilowatts to a hundred and several tens of kilowatts. Thus, when using the conventional power factor correction converter 2PA2, it is common to employ an IGBT capable of controlling a large current as the switching element. The conventional power factor correction converter 2PA2 has a simple circuit without a correction winding or the like in a choke coil.

However, since a large current having an AC power supply frequency (50 Hz or 60 Hz) superimposed on the current flowing in the power supply line flows through the choke coil, it is necessary to prevent the magnetic saturation by increasing the cross-sectional area of the core of the choke coil core. This is because magnetic components such as transformers and coils must have a large iron core when the operating frequency is low and the current is large. Therefore, it is quite difficult to reduce the size of the conventional three-phase power factor correction circuit.

Figure 10:
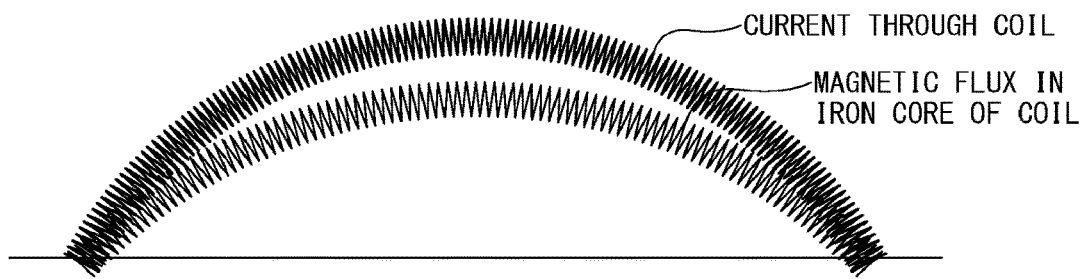
FIG. 10 is an explanatory diagram showing an example of a relationship between a current flowing through a choke coil of a conventional power factor correction converter and a magnetic flux in an iron core of the choke coil.

FIG. 10 is an explanatory diagram showing an example of a relationship between a current flowing through the choke coil of the conventional power factor correction converter 2PA2 and the magnetic flux in the iron core of the choke coil.

As shown in FIG. 10, the magnetic flux in the choke coil core is almost proportional to the coil current.

Figure 11:
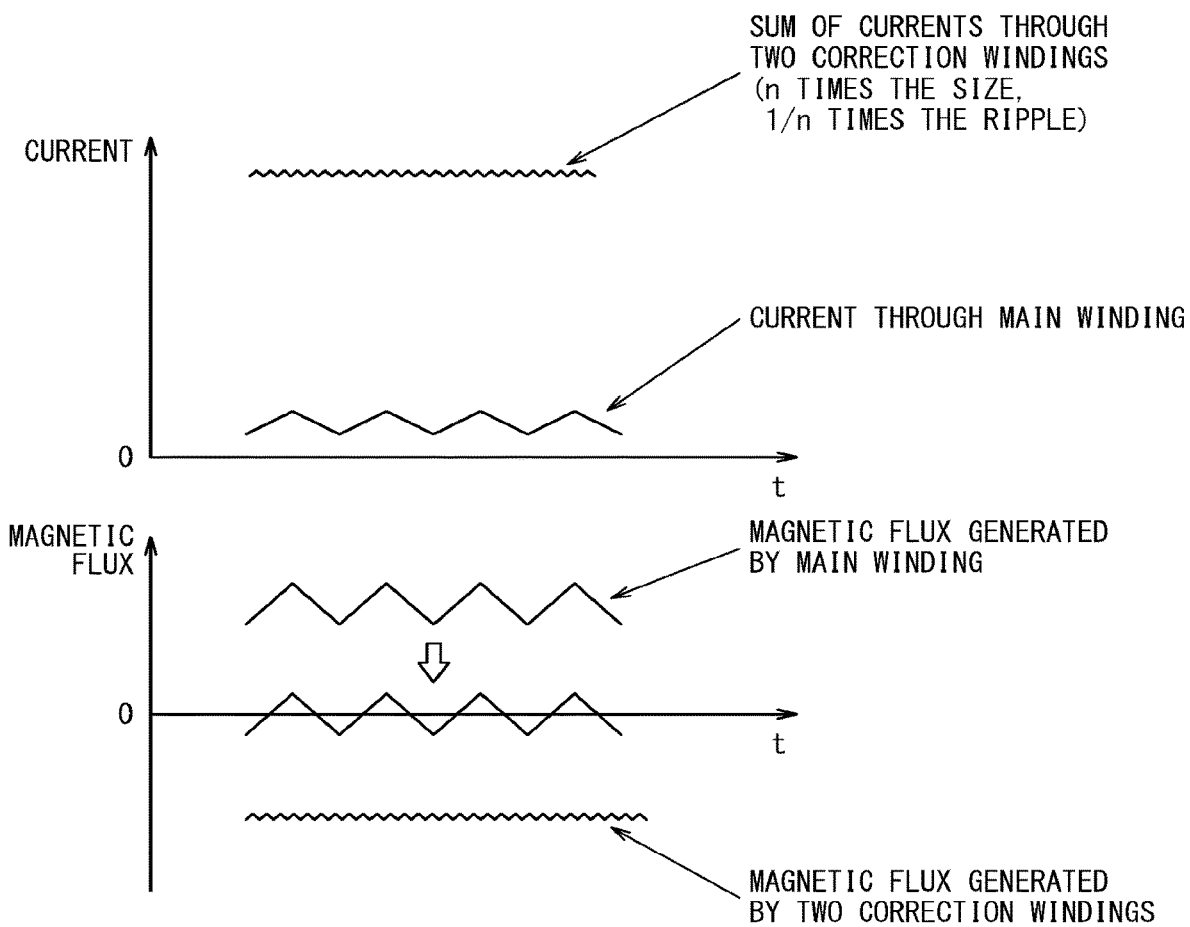
FIG. 11 is an explanatory diagram showing the relationship between a magnetic flux generated in a core of a choke coil by a main winding of a choke coil of a power factor corrector according to the present embodiment, a magnetic flux generated by two correction windings, and a magnetic flux obtained by combining these two.
Figure 12:
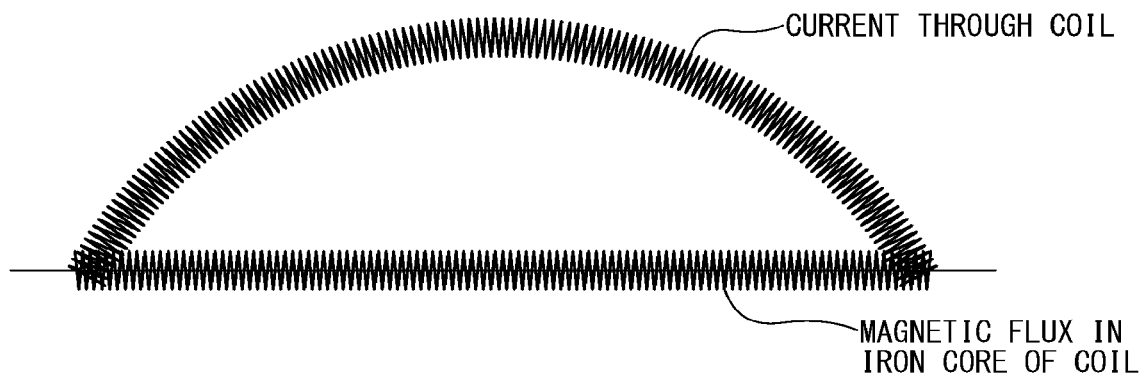
FIG. 12 is an explanatory diagram showing an example of the relationship between a current flowing through choke coils of a power factor corrector according to the present embodiment and magnetic flux in an iron core of the choke coil.

FIG. 11 is an explanatory diagram showing the relationship between a magnetic flux generated in a core of the choke coil by the main winding of the choke coil of the power factor corrector 2 according to the present embodiment, a magnetic flux generated by the two correction windings, and a magnetic flux obtained by combining these two. FIG. 12 is an explanatory diagram showing an example of the relationship between the current flowing through the choke coils of the power factor corrector 2 according to the present embodiment and magnetic flux in an iron core of the choke coil.

In the power factor corrector 2 according to the present embodiment, as shown in FIG. 5, the choke coil has the single main winding and the two correction windings, and the current flowing through the correction windings is the current obtained by summing/combining the MOSFETs currents and the diodes currents. Further, the current of the correction windings connected in series is the sum of the current flowing through the MOSFETs and the current flowing through the diodes of the n converters that perform the interleaving operation with the phases shifted. Therefore, the total current flowing through the two correction windings is n times the current flowing through the main winding of the choke coil of one converter circuit, and the current ripple can be reduced to 1/n. Therefore, when the winding turns ratio between the main winding (of the choke coils 2101 to 2n01, the choke coils 2102 to 2n02, and the choke coils 2103 to 2n03), the first correction windings, and the second correction windings may be set to n:1:1.

Further, by wiring each coil so that the direction of the magnetic flux generated by the current flowing through the two correction windings is opposite to the direction of the magnetic flux generated by the main winding, each of the currents flowing through the two correction windings flows so as to cancel the magnetic flux generated in the main winding. Therefore, the magnetic flux generated in the main winding due to the large current of the source frequency (50 Hz, 60 Hz) can be canceled (see FIG. 11).

Therefore, as shown in FIG. 12, the magnetic flux change in the iron core of the choke coil of the power factor corrector 2 according to the present embodiment can be suppressed only to the change caused by the switching operation of the MOSFET centering on zero, and hence the maximum value of the magnetic flux can be greatly suppressed. Therefore, according to the power factor corrector 2 according to the present embodiment, the iron core cross-sectional area of the choke coil can be reduced, and the choke coil can be significantly reduced in size.

Further, as shown in FIG. 5, by operating the n converter circuits in parallel in an interleaved manner, the current handled by one converter circuit can be reduced to 1/n. By suppressing the current of one converter circuit to several tens of amperes, it becomes possible to apply a MOSFET having excellent high-speed switching characteristics. Therefore, it is possible to further reduce the size of the choke coil and the converter by increasing the switching frequency.

Figure 13:
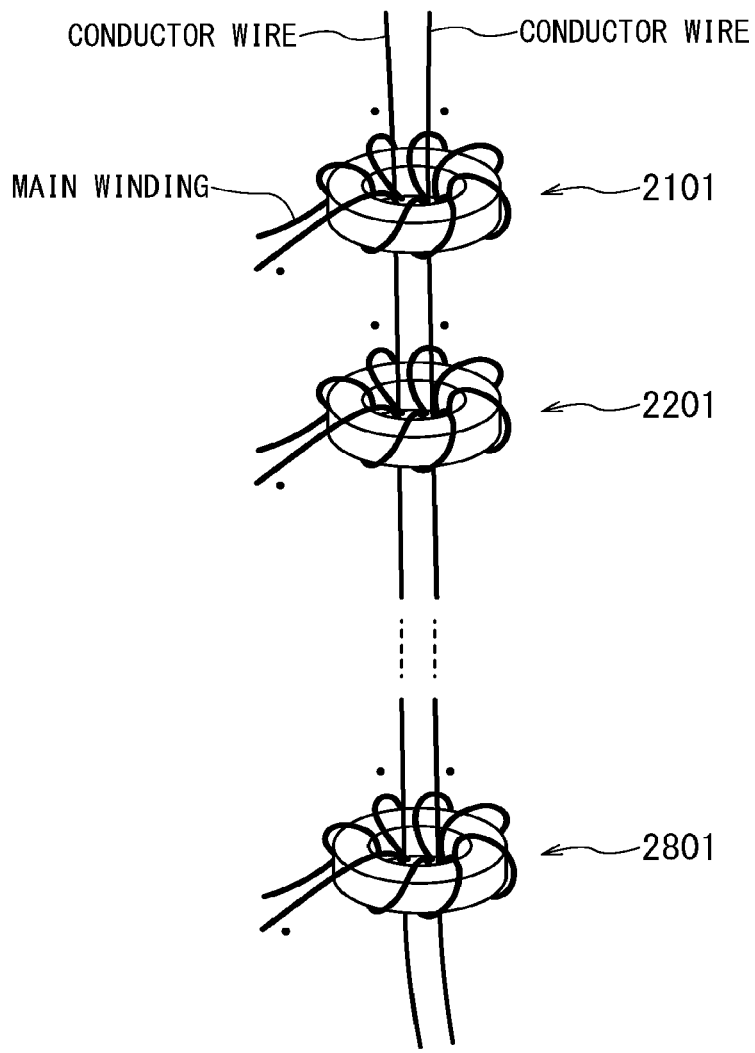
FIG. 13 is a diagram showing an example of choke coils in a case where eight converter circuits are operated in an interleaving operation.

FIG. 13 is a diagram showing an example of the choke coils 2101-2801 in a case where eight converter circuits are operated in an interleaving operation.

The eight choke coils 2102 to 2n02 have a structure in which, for example, an eight-turn main winding is wound around a toroidal core, and two conductor wires are passed through the center thereof. Each of the two conductor wires penetrating the toroidal core acts as the first correction winding and the second correction winding of one turn. The current flowing through the two conductor wires greatly changes due to the switching of the MOSFET, but this change is of the same magnitude but in the opposite direction, and hence, the noise can be reduced by arranging the two conductor wires in close contact with each other.

Figure 14:
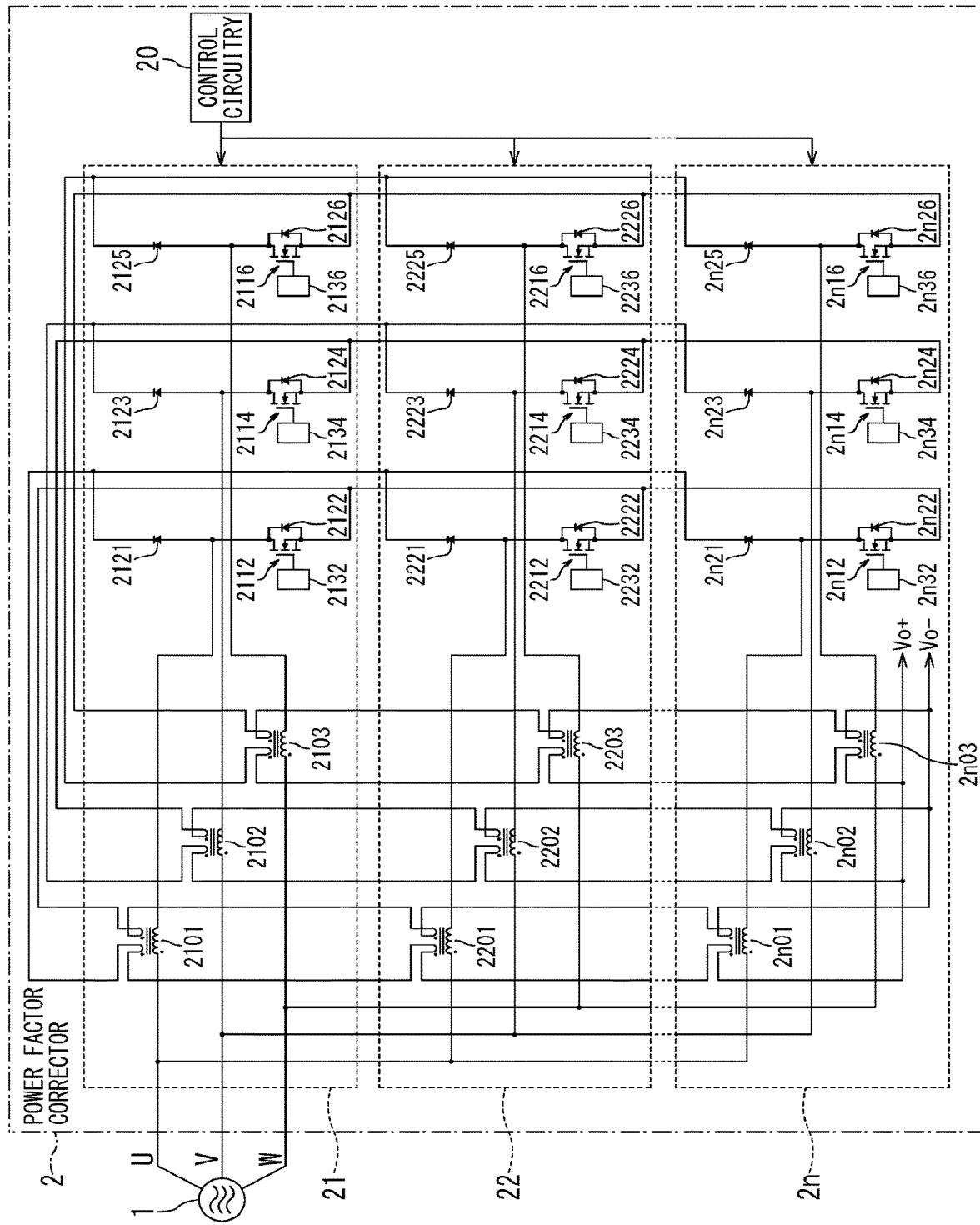
FIG. 14 is a circuit diagram showing a modification example of the power factor corrector according to the embodiment.

FIG. 14 is a circuit diagram showing a modification example of the power factor corrector 2 according to the embodiment. The power factor corrector 2 shown in FIG. 14 is different from the circuit shown in FIG. 5 in that only the converter circuit is composed of MOSFETs having only the lower arm and the number of MOSFETs is halved. Since the number of times of sending power to the output stage per one cycle of switching of the MOSFET is also halved, the circuit according to the modification example is suitable for a device having small output power.

Figure 15:
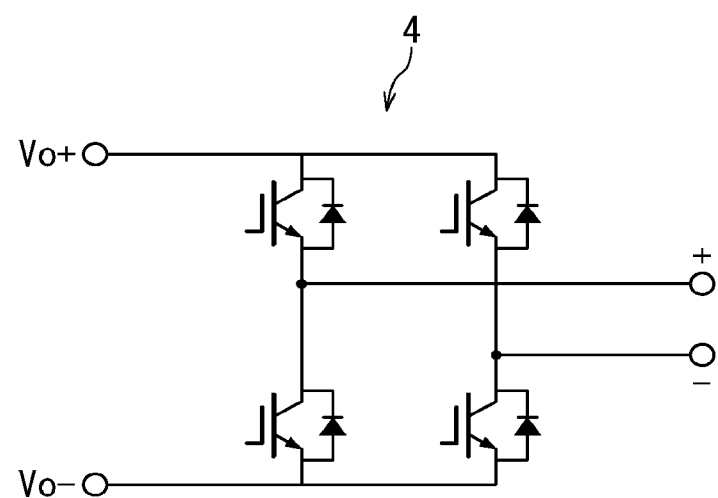
FIG. 15 is a circuit diagram illustrating an example of an inverter circuit.
Figure 16:
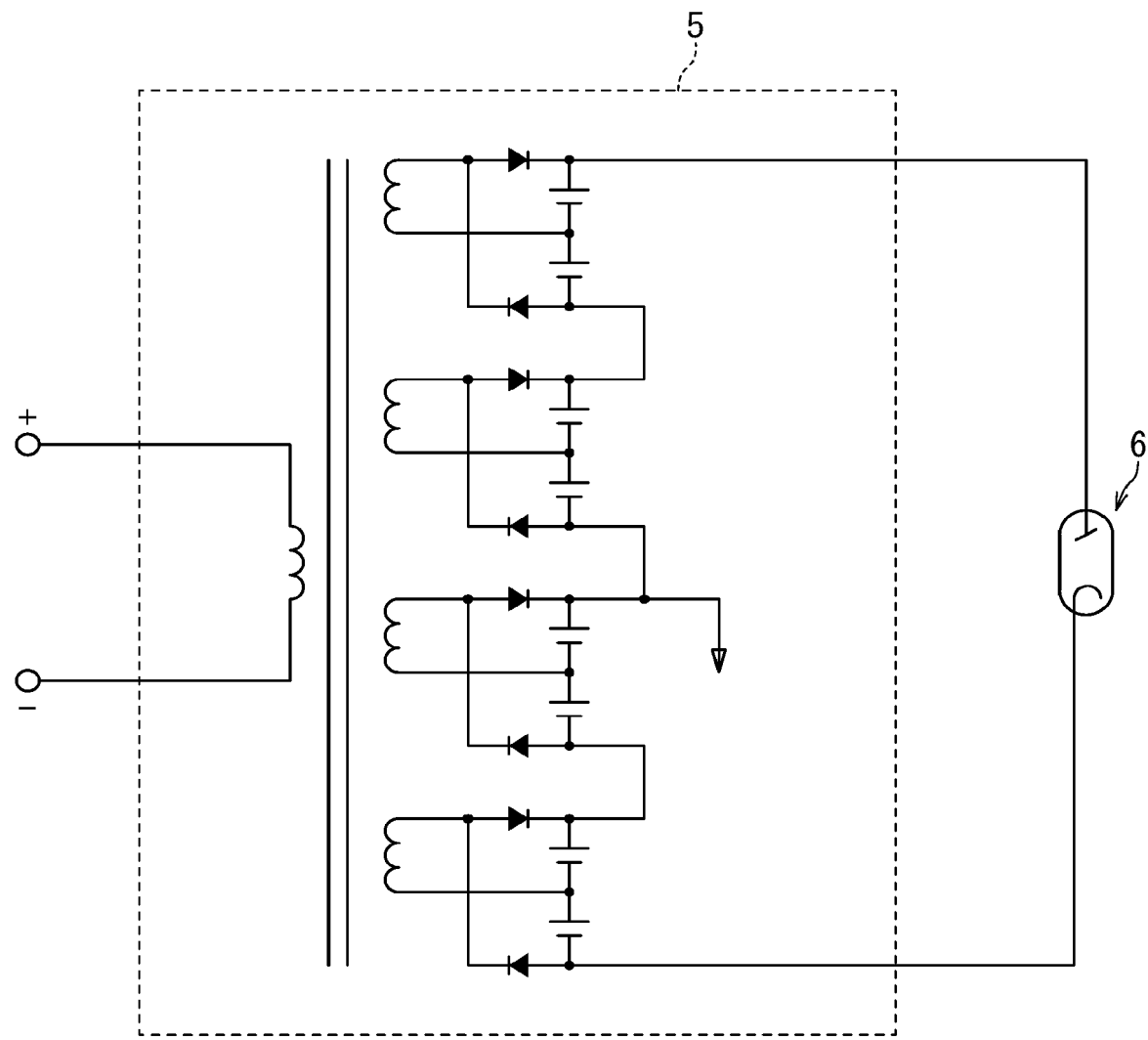
FIG. 16 is a circuit diagram illustrating an example of a high voltage generator.

FIG. 15 is a circuit diagram illustrating an example of the inverter circuit 4. FIG. 16 is a circuit diagram illustrating an example of the high voltage generator 5. The inverter circuit 4 converts the voltage converted to DC by the power factor corrector 2 into a high-frequency AC voltage by a full bridge inverter including four IGBTs (see FIG. 15). The high voltage generator 5 boosts the high frequency AC voltage generated by the inverter circuit 4 with a high voltage transformer, generates a high DC voltage with four double-voltage rectifier circuits, and supplies the high DC voltage to the X-ray tube 6 (see FIG. 16).

The power factor corrector 2 according to the present embodiment causes the plurality of high-frequency converter circuits to perform an interleaving operation (operate with phase shifting), and the choke coil has the main winding and the two correction windings. The magnetic flux generated by the large alternating current of the commercial frequency (about 50 Hz or 60 Hz) superimposed on the main winding can be canceled by the two correction windings. Therefore, the choke coil can be significantly reduced in size and weight, for example, about ⅒ of the conventional choke coil.

Hence, the X-ray high-voltage apparatus 10 including the power factor corrector 2 according to the present embodiment can improve the power factor of apparatuses that require a large amount of power for a short time such as an X-ray diagnostic apparatus and an X-ray CT apparatus, and also can reduce the size and weight thereof so as to be mountable on the apparatuses. Therefore, according to the X-ray high-voltage apparatus 10 including the power factor corrector 2 according to the present embodiment, it is possible to realize an X-ray diagnostic apparatus or an X-ray CT apparatus with a significantly improved power factor. With regard to the MRI apparatus, the maximum power is not as large as that of the X-ray diagnostic apparatus or the X-ray CT apparatus, but the MRI apparatus needs a longer diagnostic time than the X-ray diagnostic apparatus or an X-ray CT apparatus, and the MRI apparatus can also reduce the harmonic current of the input power supply by replacing the conventional AC/DC converter with the power factor corrector 2 according to the present embodiment.

Further, as shown in FIG. 1, by connecting the power storage device 3 to a DC line connecting the power factor corrector 2 and the inverter circuit 4, the peak power can be easily supplemented by the energy stored in the power storage device 3. Therefore, a high-performance X-ray diagnostic apparatus or X-ray CT apparatus having a large peak power can be used even with a small-capacity power supply facility. In this case, the charging current control of the power storage device 3 can be realized by controlling the on/off time of the switching device of the power factor corrector 2. In the conventional AC/DC converter circuit 2PA1 shown in FIG. 3, the power storage device 3 cannot be connected to a DC line connecting the AC/DC converter circuit 2PA1 and the inverter circuit 4.

According to the power factor corrector 2 according to the present embodiment, an X-ray high-voltage power supply that is small and lightweight, has extremely low harmonic current, and has a peak power assisting function can be applied to an X-ray diagnostic apparatus and an X-ray CT apparatus. Further, a gradient magnetic field power supply that is small, lightweight, has extremely low harmonic current, and has a peak power assisting function can be applied to the MRI apparatus.

In the above embodiment, an example in which the three-phase AC power supply 1 is used as the input power supply has been described. However, the power factor corrector 2 according to the present embodiment can be appropriately modified and applied regardless whether the input power supply is a single-phase AC power supply or a three-phase four-wire power supply.

According to at least one of the above-described embodiments, it is possible to suppress an increase in the size of the choke coil while improving the power factor in the power factor corrector.

The control circuitry in the above-described embodiments is an example of the control circuitry described in the claims. In addition, the term "processor" of the control circuitry 20 used in the explanation in the above-described embodiments, for example, refer to circuitry such as dedicated or general purpose CPUs (Central Processing Units), dedicated or general-purpose GPUs (Graphics Processing Units), or ASICs (Application Specific Integrated Circuits), programmable logic devices including SPLDs (Simple Programmable Logic Devices), CPLDs (Complex Programmable Logic Devices), and FPGAs (Field Programmable Gate Arrays). The processor implements various types of functions by reading out and executing programs stored in the memory.

Although in the above-described embodiments an example is shown in which the control circuitry configured of a single processor implements every function, the control circuitry may be configured by combining plural processors independent of each other so that each processor implements each function of the control circuitry by executing corresponding program. When a plurality of processors are provided for the control circuitry, the memory for storing programs may be individually provided for each processor, or single memory may collectively store programs corresponding to all the functions of the processors.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the scope of the inventions. The accompanying claims and their equivalents are intended to cover such forms or modifications as would fall within the scope of the inventions.

What is claimed is:

1. An X-ray high voltage apparatus comprising:
a plurality of converters converting AC power to DC power, wherein each converter includes choke coils and three-phase rectifier circuits, each choke coil having a main winding and being provided on each phase line of three-phase AC power supply lines, each three-phase rectifier circuit including a switching device; and
control circuitry configured to interleave the plurality of converters, wherein
the each choke coil of the each converter has the single main winding, and two correction windings that are a first correction winding and a second correction winding, and
each of currents flowing through the respective two correction windings is a sum of currents flowing through the plurality of converters performing interleaving operation, and flows so as to cancel a magnetic flux generated in the main winding.

2. The X-ray high voltage apparatus according to claim 1, wherein
for each of first correction windings of the plurality of converters:

the first correction windings, each corresponding to the main winding provided on a first phase line of the three-phase AC power supply lines, are connected in series;

the first correction windings, each corresponding to the main winding provided on a second phase line, are connected in series; and the first correction windings, each corresponding to the main winding provided on a third phase line, are connected in series, and for each of second correction windings of the plurality of converters:

the second correction windings, each corresponding to the main winding provided on the first phase line, are connected in series;

the second correction windings, each corresponding to the main winding provided on the second phase line, are connected in series; and the second correction windings, each corresponding to the main winding provided on the third phase line, are connected in series.

3. The X-ray high voltage apparatus according to claim 1, wherein, when the number of the plurality of converters is n, a winding turns ratio among the main winding, the first correction winding, and the second correction winding is n:1:1.

4. The X-ray high voltage apparatus according to claim 2, wherein:

the positive electrode sides of the DC output of each switching device connected to the first phase line are connected in parallel and are connected to one of the two correction windings corresponding to the main winding provided on the first phase line;

the negative electrode sides of the DC output of the each switching device connected to the first phase line are connected in parallel and are connected to the other of the two correction windings corresponding to the main winding provided on the first phase line;

the positive electrode sides of the DC output of each switching device connected to the second phase line are connected in parallel and are connected to one of the two correction windings corresponding to the main winding provided on the second phase line;

the negative electrode sides of the DC output of the each switching device connected to the second phase line are connected in parallel and are connected to the other of the two correction windings corresponding to the main winding provided on the second phase line;

the positive electrode sides of the DC output of each switching device connected to the third phase line are connected in parallel and are connected to one of the two correction windings corresponding to the main winding provided on the third phase line; and the negative electrode sides of the DC output of the each switching device connected to the third phase line are connected in parallel and are connected to the other of the two correction windings corresponding to the main winding provided on the third phase line.

5. An X-ray high voltage apparatus according to claim 1, further comprising a high voltage generator generating a high DC voltage based on DC voltage outputs from the plurality of converters and applying the high DC voltage to an X-ray tube.

6. The X-ray high voltage apparatus according to claim 5, further comprising:

an inverter converting the DC voltage outputs from the plurality of converters to a high-frequency AC voltage and inputs the high-frequency AC voltage to the high-voltage generator; and a power storage device provided to a DC voltage line for supplying the DC voltages from the plurality of converters to the inverter to charge the DC voltage outputs from the plurality of converters.

7. The X-ray high voltage apparatus according to claim 6, wherein, when a DC high voltage that is required to be generated by the high voltage generator is equal to or more than a predetermined value, a DC power is supplied from the power storage device to the inverter in addition to the DC voltage outputs from the plurality of converters.

8. A power factor corrector comprising:

a plurality of converters converting AC power to DC power, wherein each converter includes choke coils and three-phase rectifier circuits, each choke coil having a main winding and being provided on each phase line of three-phase AC power supply lines, each three-phase rectifier circuit including a switching device; and control circuitry configured to interleave the plurality of converters, wherein the each choke coil of the each converter has the single main winding and two correction windings, and each of currents flowing through the respective two correction windings is a sum of currents flowing through the plurality of converters performing interleaving operation, and flows so as to cancel a magnetic flux generated in the main winding.

* * * * *